(12) United States Patent
Barnes

(10) Patent No.: X8924
(45) Date of Patent: Jun. 26, 1835

(54) STEAM ENGINE, ROTARY

(76) Inventor: Orson Barnes

United States Patent

Patent No.: X8924

Henry Gordon, of Fountain Dale, Penn^a.
Letters Patent

The Schedule referred to in these Letters Patent, and making part of the same containing a description in the words of the said Henry Gordon, himself, of his improvement in the machine for extracting Stumps, trees &c.

---

To all to whom these presents shall come - Be it known that I Henry Gordon, of Fountain Dale in the County of Adams and State of Pennsylvania, have invented a new and useful improvement in the Stump extractor, for drawing up Stumps, Trees &c. and that the following is a full and exact description of the construction & operation of the said machine, as invented or improved by me - Two planks are to be secured together at their ends, by interposing at each, a piece of timber of from two to five inches thick, by about a foot or more in length, so as to leave a space or opening between these planks of from six to eight feet in length, their thickness will be about two inches, one of them will also have an opening or groove of about three inches in width extending the whole length of the first described opening, and along the middle of the plank (which will be about a foot wide.) -

That portion left on each side of this opening, is to be perforated by pin holes passing through it, and the plank behind it, and they will be placed alternately - In the opening first described, is to play the end of a lever extending from the stump or tree to be extracted. This end has a strong iron hook or staple, fixed into it, which fastens into another on the end of a lever working in the same opening on the opposite side: and that end operating on the Stump, rests upon it passing a little over. It is secured to it by means of hooks or dogs descending from that part of the lever immediately over the side of the Stump nearest the end operated on by the other lever, which dogs may be either driven into the Stump, or hooked to a chain passed round it for extraction - Should the tree or Stump be small, this will be power sufficient, but should more be required, I use another pair of planks secured together at their ends in the same manner, but without the second described opening or groove, and having the holes somewhat nearer together, and the length of the planks somewhat longer. By this second ar-
rangement, another lever may be applied, which will be hooked on as in
the first instance, where the hand would be otherwise be employed. but where this
will be necessary. I use a double, instead of a single lever, hooking into the
stump lever the end of which is in that case to work in the second describ'd
opening or groove. The double lever will have the hook in the centre & the
second pair of planks & apparatus thereto attached, adjusted at each end.
Should the power be still required to be increased, the end of the lever work-
ing in the second pair of planks may be operated on by the two swords
usually employed in the common cider mill. Such is the construction of my ma-
chine, the operation is as follows. My first described pair of planks is to be
set up in a perpendicular direction, and the stump lever properly secured to
the stump either by the dogs or the chain, having the end resting on the
stump, in which case it will be rolled out - or resting on a trestle or blocks
and in which case it will be drawn out - the end having the staple or
hook is passed on to the opening in the upright planks, where it is fastened
to the hook of the second lever to be operated on by the hand. This second
lever is supported at the necessary height by a pin passing through the holes
already described, and which forms the fulcrum or pivot on which it moves.
by depressing the other end by hand, the stump lever is raised, till by the
power communicated thro' the dogs or chain the stump rolls over, or is
raised, either without, or with the use of a trestle - - .
Should more power be required, I change my process, and bring the end
of the stump lever into the second described groove; where it is fastened to the
hook on the double lever, and a pin applied through the holes on one side, that
end being opposite, is now raised, and a pin inserted beneath it. the power
is now applied on the other end, and another pin inserted and so on, till
the stump is extracted. To the ends of my double lever I apply my second
pair of planks another lever being there hooked on, in the first described open-
ing and a pin applied beneath it, as often as required to mend the pur-
chase. To the end of this lever the double swords may be applied - -
In order to extract a tree by the roots I use the following process - a
notch is cut in the tree on the opposite side to the machine presenting a horizontal surface on which to rest a small square stud, having the ends somewhat rounded these ends project enough from the sides of the tree to admit of a lever to rest on each, having a notch or groove cut in the end of each lever for the purpose of drawing the stud close against the tree, the opposite ends are connected together firmly, & terminate in the hook above described. On these levers rest another small square stud, applied close to the tree, on the opposite side to the one already described and these levers having pins projecting along their length, receive other shorter levers with holes made to correspond with the pins, which prevents slipping. These shorter levers bear against the small square stud last mentioned, and consequently when the stump lever is raised, force the tree down. Or to raise the tree I use a trestle on which to apply the ends of the stump levers - and in that case secure them to the tree either by boring a hole through it & driving a bolt into it or by adjusting the dogs & chain —

What I claim as my own invention & not previously known in the above described machine is the manner in which I combine the leverage from the first described pair of planks, & continue it to the stump or tree to be extracted as above described - In testimony that the above is a full and exact description of the construction & use of my machine as above described, I have hereunto set my hand this fifth day of January in the year eighteen hundred & thirty-five -

Witnesses
Robt. Clarke
Henry Stone

Henry Gordon

Exd
[illegible]

Orson Barnes of the town of Van Buren county of Onondaga State
of Newyork.

Letters Patent

The schedule referred to in these Letters Patent and making part
of the same containing a description in the words of the said Orson Barnes
himself of his improvement in the rotary Steam Engine.

To all to whom these Presents shall come:

Be it Known, that I Orson Barnes of the town of Van Buren in
the county of Onandaga & State of NewYork, have invented a new and
useful improvement in the Steam rotary engine & that the following is a
full and exact description thereof 1st. A tight enclosed circular wheel
of metal or wood of any given diameter or thickness (see the annexed draft)
2d. an axle or shaft passing through the centre of said wheel 3d. Said
axle or shaft is hollow from one end thereof to the centre of the diameter
of the wheel & through this hollow of the axle the steam is conveyed to
the tubes or steam boxes hereinafter mentioned 4th. There are to be one
or more tubes or boxes passing from the axle to the surface or rim of said
wheel, through which tubes the steam is conveyed from the axle to the
rim of the wheel and then discharged on the rim of the wheel by transverse apertures at right angles with the tubes
in opposite directions 5th. From these apertures the steam is let off into
a tight case, which encloses the above mentioned wheel and from thence into a con-
densing box— What I claim as my own invention & not previously known
in the above described machine is the discharging of the steam on the
outside of the rim of a tight enclosed circular wheel at the greatest
possible distance from the axle or shaft of said Wheel, by which an increase
of power is gained over any other rotary engine, because the steam
tubes being enclosed in a tight circular wheel are thereby greatly
strengthened and moved with less resistance than unenclosed arms
or tubes and may be extended to any extent without breaking vibra-
ting or trembling— In Witness whereof I have hereunto set my hand
this 30th. day of May 1835

Witnesses

James R. Lawrence
H. J. Shumway

Orson Barnes

[illegible]